(12) United States Patent
Onose et al.

(10) Patent No.: US 6,640,642 B1
(45) Date of Patent: Nov. 4, 2003

(54) CAPACITANCE-TYPE PRESSURE SENSOR

(75) Inventors: Yasuo Onose, Tokai (JP); Atsuo Watanabe, Hitachiota (JP); Seiji Kuryu, Hitachinaka (JP); Shinya Satou, Hitachi (JP); Junichi Horie, Hitachinaka (JP); Satoshi Shimada, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/653,808

(22) Filed: Sep. 1, 2000

(30) Foreign Application Priority Data

Feb. 23, 2000 (JP) ........................................ 2000-052187

(51) Int. Cl.$^7$ ................................................ G01L 9/12
(52) U.S. Cl. ........................................ 73/718; 73/724
(58) Field of Search ..... 73/718, 724; 361/283.1–283.4; 181/157, 163, 164, 174; 381/186

(56) References Cited

U.S. PATENT DOCUMENTS 5,479,827 A * 1/1996 Kimura et al. ................. 73/718
6,167,761 B1 * 1/2001 Hanzawa et al. ............. 73/724

FOREIGN PATENT DOCUMENTS

| JP | 06-300650 | 10/1994 |
| JP | A-6-307960 | 11/1994 |
| JP | A-8-233672 | 9/1996 |
| JP | 11-014482 | 1/1999 |

* cited by examiner

Primary Examiner—Edward Lefkowitz
Assistant Examiner—Jermaine Jenkins
(74) Attorney, Agent, or Firm—Crowell & Moring LLP

(57) ABSTRACT

A pressure sensor of electric capacitance type which includes a plurality of pressure sensor units connected in parallel with one another and each formed on a substrate by an electrode, a cavity region and a diaphragm having an electrically conductive film which is disposed in opposition to the electrode with the cavity region intervening between the electrode and the diaphragm, wherein diaphragm fixing portions are disposed internally of the cavity region so that a single sheet of the diaphragm is partitionarily and regionally allotted to regions of the plural pressure sensor units, respectively. With this structure of the capacitance-type pressure sensor, ineffective region for capacitance detection is minimized and hence the parasitic capacitance can be reduced with the detection accuracy of the sensor being improved.

9 Claims, 4 Drawing Sheets

ONE SENSOR UNIT

ONE SENSOR UNIT

CAPACITANCE-TYPE PRESSURE SENSOR

BACKGROUND OF THE INVENTION

1. Field of the Invention

The present invention relates to a pressure sensor of electric capacitance type (also referred to as the capacitance-type pressure sensor).

2. Description of the Related Art

As a conventional capacitance-type pressure sensor known heretofore, there may firstly be mentioned a device described in Japanese Patent Application Laid-Open Publication No. 233672/1996 (JP-A-8-233672).

According to the conventional technique disclosed in the above publication, a cavity is formed in an auxiliary layer covered with a diaphragm layer by way of passages or gaps formed in the diaphragm layer, whereon these gaps are closed so as not to form any part of a shielding layer deposited on the diaphragm layer in a finishing process. In this way, the finished diaphragm is imparted with a desired deformability.

Further, as a conventional capacitance-type pressure sensor known heretofore, there may secondly be mentioned a device described in Japanese Patent Application Laid-Open Publication No. 307960/1994 (JP-A-6-307960).

In the device disclosed in the publication mentioned just above, pressure sensors are disposed in a matrix-like array, wherein diaphragms formed of polysilicon are disposed above electric conductor patterns formed on a top surface of a silicon substrate in order to determine or detect electric capacitance which change in dependence on compressive distortion. These diaphragms are formed with at least two different sizes, and a number of sensors including respective diaphragms of a same size are accommodated in one subunit. Thus, there are formed at least two subunits, wherein the individual subunits are so implemented that the basic capacitances thereof assume a same value.

The first mentioned conventional technique suffers a problem that the size of the diaphragm which determines the pressure characteristic of the sensor may differ from one to another sensor due to dispersion in the etching condition because of formation of the cavities through partial etching of the auxiliary layer by way of the gaps formed in the diaphragm layer by resorting to a time-based control. Further, in the case where a plurality of sensors are to be interconnected in parallel with one another, there arises necessity for holding the intersensor distance so that the adjacent sensors and cavities are not physically coupled to one another. For this reason, the so-called ineffective region which does not contribute to formation of capacitance to be detected increases, involving increased parasitic capacitance. The increased parasitic capacitance in turn brings about a problem that difficulty is encountered in detecting the pressure with high accuracy.

On the other hand, in the case of the second-mentioned conventional capacitance-type pressure sensor, a large number of sensors to be connected in parallel have independent diaphragms and cavity regions, respectively. Consequently, the so-called ineffective region which does not contribute to formation of capacitance to be detected increases, involving increased parasitic capacitance due to the ineffective region. The increased parasitic capacitance in turn brings about difficulty in detecting the pressure with high accuracy, giving rise to a problem.

SUMMARY OF THE INVENTION

In the light of the state of the art described above, it is an object of the present invention to provide a capacitance-type pressure sensor whose the parasitic capacitance is suppressed from increasing and which can ensure pressure detection with enhanced accuracy.

In view of the above and other objects which will become apparent as the description proceeds, there is provided according to a general aspect of the present invention a pressure sensor of electric capacitance type which includes a plurality of pressure sensor units connected in parallel with one another and each formed on a substrate by an electrode, a cavity region and a diaphragm having an electrically conductive film which is disposed in opposition to the aforementioned electrode with the cavity region intervening between the electrode and the diaphragm, wherein diaphragm fixing portions are disposed internally of the cavity region so that a single sheet of the diaphragm is partitionarily and regionally allotted to regions of the plurality of pressure sensor units, respectively.

By virtue of the structure of the capacitance-type pressure sensor described above, ineffective region which does not contribute to the formation of the capacitance to be detected can be minimized with the parasitic capacitance being reduced, whereby the detection accuracy of the sensor can be enhanced significantly.

In a preferred mode for carrying out the invention, the electrode and the diaphragm may be formed on a semiconductor substrate with an insulation film being interposed therebetween.

In another preferred mode for carrying out the invention, etching holes may be formed in the diaphragm for thereby forming the cavity region, which is advantageous in that the throughput of the manufacturing process can be enhanced.

In yet another preferred mode for carrying out the invention, etching holes may be formed at positions on lines interconnecting the diaphragm fixing portions. Owing to this feature, the diaphragm size of the pressure sensor units defined by the diaphragm fixing portions can be protected against differing from one to another sensor unit.

In a further preferred mode for carrying out the invention, a conductive film may be deposited over a surface of a topmost film constituting the diaphragm so as to cover the diaphragm wholly. With this structure, the reliability as well as the detection accuracy of the sensor can be enhanced.

As is apparent from the foregoing, with the structures of the capacitance-type pressure sensor according to the present invention, ineffective region which plays no role in capacitance detection can be minimized, whereby the parasitic capacitance of the sensor can be reduced with the detection accuracy thereof being enhanced significantly.

BRIEF DESCRIPTION OF THE DRAWINGS

In the course of the description which follows, reference is made to the drawings, in which.

DESCRIPTION OF THE EMBODIMENTS

Figure 1:
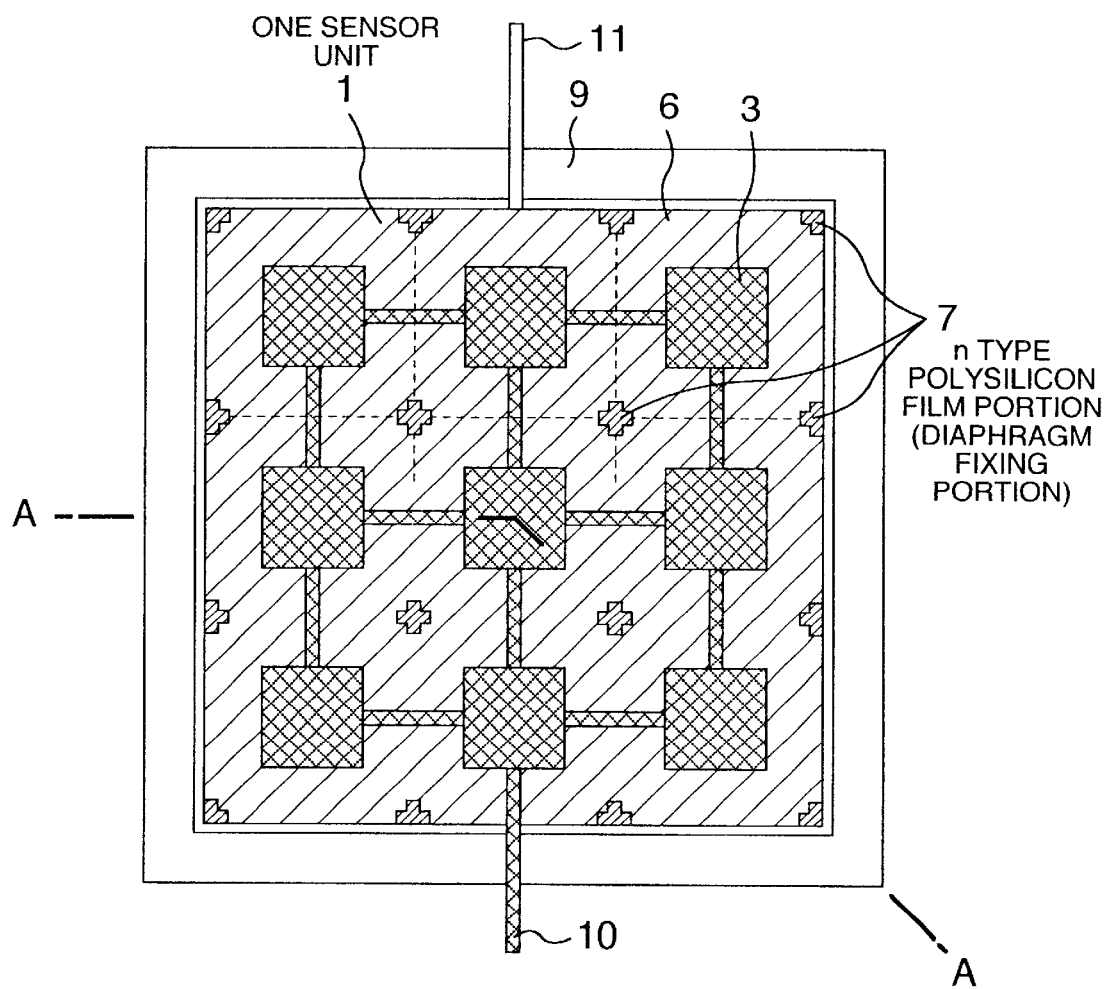
FIG. 1 is a top plan see-through view of a capacitance-type pressure sensor according to a first embodiment of the present invention.

The present invention will be described in detail in conjunction with what is presently considered as preferred or typical embodiments thereof by reference to the drawings. In the following description, like reference characters designate like or corresponding parts throughout the several views.

Embodiment 1

Figure 2:
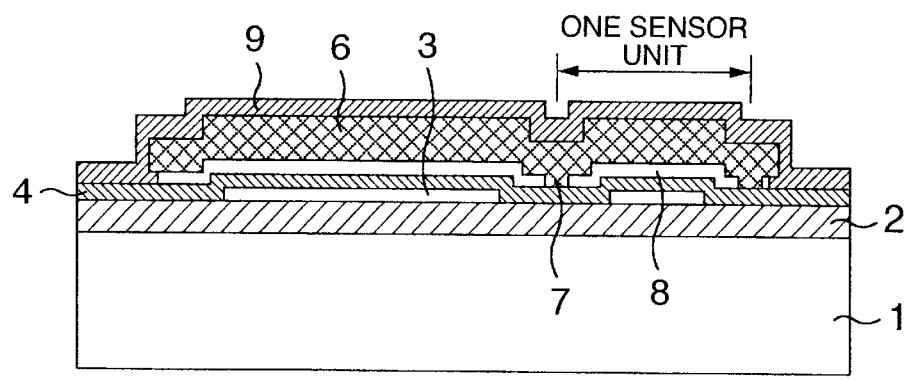
FIG. 2 is a sectional view of the same taken along a line A—A in FIG. 1.

Now, description will be made of the capacitance-type pressure sensor according to a first embodiment of the present invention by reference to FIG. 1 and FIG. 2 in which FIG. 1 is a top plan see-through view of the capacitance-type pressure sensor and FIG. 2 is a sectional view of the same taken along a line A—A in FIG. 1.

Referring to FIGS. 1 and 2, reference numeral 1 denotes a semiconductor substrate having one surface over which a silicon oxide film 2 is deposited as an insulation film. Disposed on the silicon oxide film 2 in a matrix-like pattern are n-type polysilicon films 3 which serve as electrodes (fixed electrodes), respectively, wherein the n-type polysilicon films 3 are electrically connected in parallel with one another, as can be seen in FIG. 1. Further formed or deposited over the silicon oxide film 2 and the n-type polysilicon films 3 is a silicon nitride film 4 as an insulation film which is to serve as an etching stopper when a cavity region 8 is formed.

Disposed internally of the cavity region 8 are n-type polysilicon film portions 7 which serve as diaphragm fixing portions for supporting a sheet of diaphragm while partitioning regionally the diaphragm into a plurality of diaphragm sections each of a predetermined size for a plurality of sensor unit regions, respectively. Further, provided over the cavity region 8 is an n-type polysilicon film portion 6 which constitutes a part of the diaphragm and which serves as an electrode (movable electrode).

Deposited over the n-type polysilicon film portion 6 is a silicon oxide film 9 in such a manner that the cavity region 8 is thereby vacuum-sealed, i.e., sealed off in the evacuated state. Further, a fixed electrode lead-wire 10 and a movable electrode lead-wire 11 are provided for the fixed electrodes (n-type polysilicon film) 3 and the movable electrode (n-type polysilicon film portion) 6, respectively, wherein both the fixed electrodes and the movable electrode are lead out to be electrically connected to a capacitance detecting circuit (not shown).

As will be appreciated from the above description, the diaphragm is composed of the n-type polysilicon film portion 6 and the silicon oxide film 9. Magnitude of flexure or deflection of the diaphragm changes in response to variation in the ambient pressure, which brings about a corresponding change or variation in the thickness of the cavity region 8. In this conjunction, the electrical capacitance C formed between the fixed electrode (n-type polysilicon film) 3 and the movable electrode (n-type polysilicon film portion) 6 can be represented by the following expression:

$$C = \epsilon 0 \cdot \epsilon \cdot S/d \quad (\text{Eq. 1})$$

where $\epsilon 0$ represents dielectric constant of vacuum, $\epsilon$ represents relative dielectric constant of inter-electrode substance, S represents opposite electrode area, and d represents inter-electrode distance.

As is apparent from the above expression (Eq. 1), change of the thickness of the cavity region 8 is accompanied with a change in the inter-electrode distance d, which incurs a corresponding change in the electrical capacitance C. Thus, it is possible to detect the pressure on the basis of the electrical capacitance C.

In the capacitance-type pressure sensor according to the instant embodiment of the invention, the n-type polysilicon film portions 7 serving as the diaphragm fixing portions are made use of for integral implementation with the n-type polysilicon film portion 6 serving as the movable electrode. In this conjunction, it should however be mentioned that an insulation film such as a silicon nitride film may be employed substantially to the same effect.

Further, although the diaphragm fixing portions (n-type polysilicon film portions) 7 are disposed only at corner portions defining the sensor units, the number of the diaphragm fixing portions 7 may be increased when occasion requires.

Furthermore, in the foregoing description of the capacitance-type pressure sensor according to the first embodiment of the invention, it has been presumed that nine sensor units are connected in parallel with one another. It should however be understood that the invention is never restricted to any specific number of the sensor units but a given number of sensor units may be formed as occasion requires.

Additionally, in the capacitance-type pressure sensor according to the first embodiment of the invention, the fixed electrodes 3 are each implemented in a square shape and connected in parallel with one another. However, the fixed electrode 3 may be formed in other suitable shape. Besides, the fixed electrode 3 may be formed over the whole surface of the silicon oxide film.

With the teachings of the present invention incarnated in the capacitance-type pressure sensor according to the first embodiment thereof, the sensor unit regions of the diaphragm are partitioned or defined only by the diaphragm fixing portions 7, wherein the diaphragm, the cavity region and the diaphragm fixing portions 7 of the adjacent sensor units are shared in common among the sensor unit regions. Thus, the ineffective region which provides no contribution to formation of the capacitance to be detected decreases, which in turn means that the parasitic capacitance is reduced. Besides, since the fixed electrodes are formed on the insulation film, the parasitic capacitance can further be reduced by increasing the thickness of the insulation film.

In the following, a preferred process or method of manufacturing the capacitance-type pressure sensor according to the first embodiment of the present invention will be described by reference to FIGS. 3A to 3D which show the manufacturing process in the order of process steps.

Figure 3A:
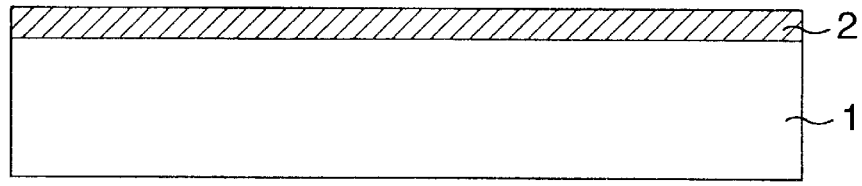
FIGS. 3A to 3D are views for illustrating a process or method of manufacturing the capacitance-type pressure sensor according to the first embodiment of the present invention in the order of process steps.

Processing Step Shown in FIG. 3A

The silicon oxide film (insulation film) 2 is formed over the silicon substrate 1 through a thermal oxidation process.

Figure 3B:
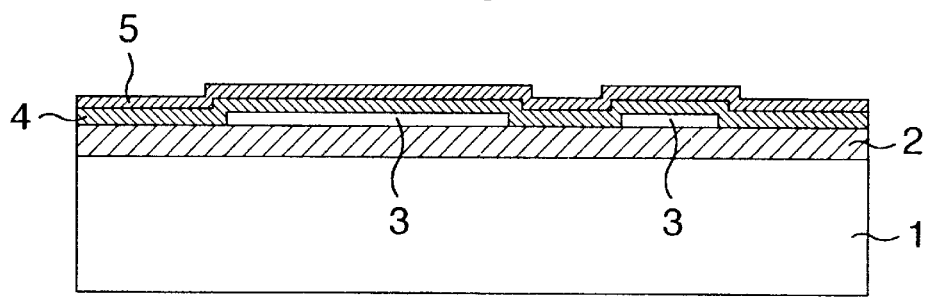

Process Step Shown in FIG. 3B

At first, a polysilicon film is deposited over the silicon oxide film (insulation film) 2 by a CVD (Chemical Vapor Deposition) method, which is then followed by doping the polysilicon film to n-type by resorting to, for example, a phosphorus ion implantation. Subsequently, the n-type polysilicon film is patterned by photo-etching, to thereby form the n-type polysilicon film 3. Subsequently, the silicon nitride film 4 is deposited through CVD, which is then followed by deposition of the silicon oxide film 5 as the auxiliary film through CVD. In this conjunction, the silicon oxide film 5 should preferably be capable of being etched at a high rate by hydrofluoric acid. To this end, the silicon oxide film 5 should preferably be formed of e.g. PSG (Phospho-Silicate Glass), BPSG (Boron-doped Phospho-Silicate Glass) or the like.

Figure 3C:
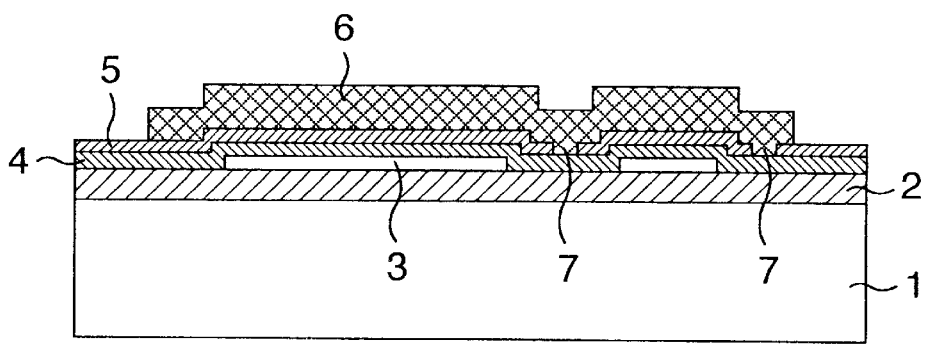

Process Step Shown in FIG. 3C

At first, the silicon oxide film 5 is patterned by photo-etching. Subsequently, a polysilicon film is deposited over the patterned silicon oxide film 5 and doped to n-type, for example, by phosphorus ion implantation. In succession, patterning is carried out by photo-etching to thereby form simultaneously the n-type polysilicon film portions 7 serving as the diaphragm fixing layers and the n-type polysilicon film portion 6 serving as the movable electrode, respectively.

Figure 3D:
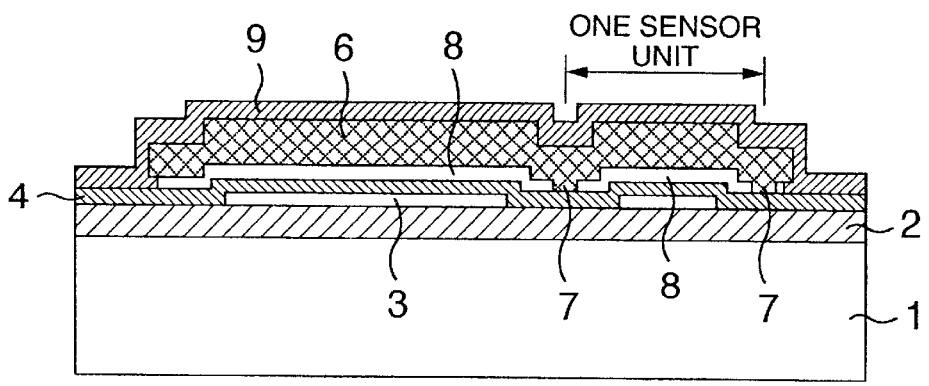

Process Step Shown in FIG. 3D

The silicon oxide film 5 is removed by side-etching from the outer peripheral ends of the n-type polysilicon film portion 6 to thereby form the cavity region 8. Subsequently, the silicon oxide film 9 is deposited through CVD under vacuum to thereby seal off the aforementioned cavity region 8 in the evacuated state. The silicon oxide film 9 functions as the vacuum seal film and the diaphragm constituting film.

Needless to say, the pressure sensor according to the instant embodiment of the invention and a complementary MOS (metal oxide semiconductor) circuit device can simultaneously be formed although illustration and description thereof are omitted. It should be pointed out that by implementing the pressure sensor from the multiple or parallel connection of the sensor units as described above, the capacitance value for detection as required can be determined by the number of the sensor units while allowing the thickness of the diaphragm to be selected with high degree of freedom. Thus, the process of manufacturing the capacitance-type pressure sensor according to the present invention well matches the conventional complementary MOS process, making it possible to carry out the process at high yield and low cost.

Embodiment 2

Figure 4:
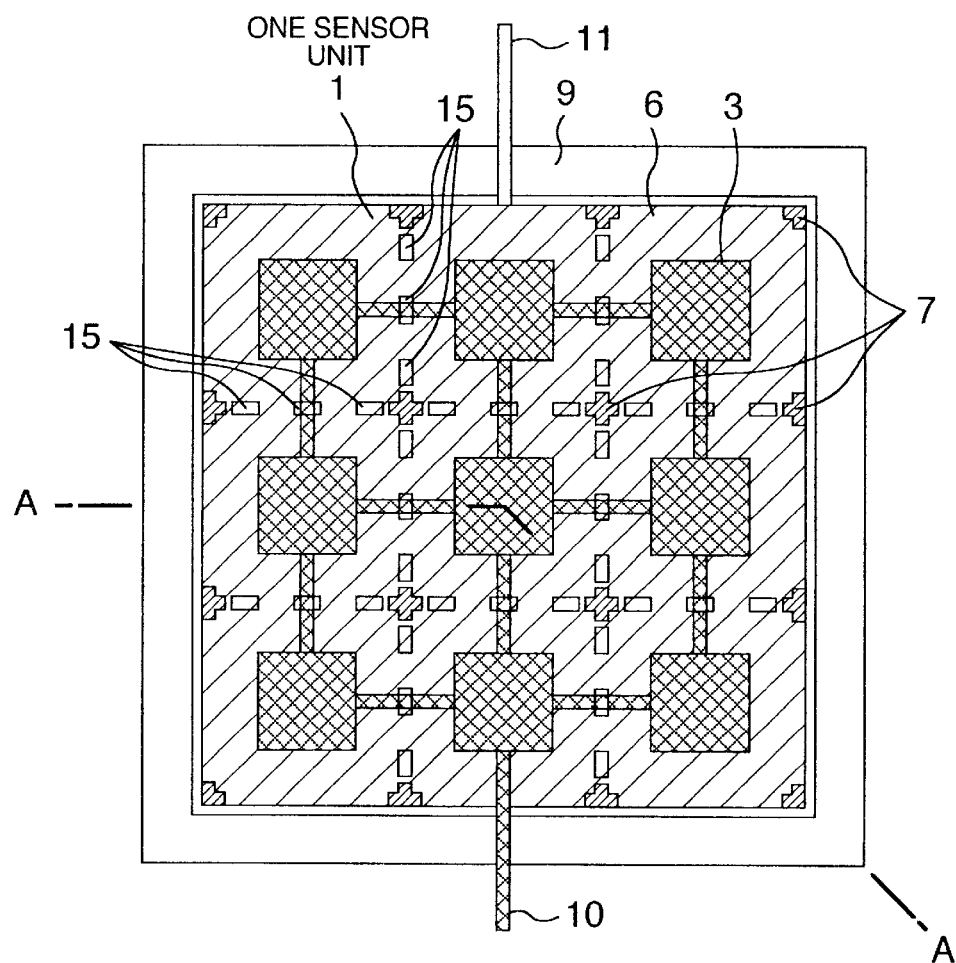
FIG. 4 is a top plan see-through view of the capacitance-type pressure sensor according to a second embodiment of the present invention.
Figure 5:
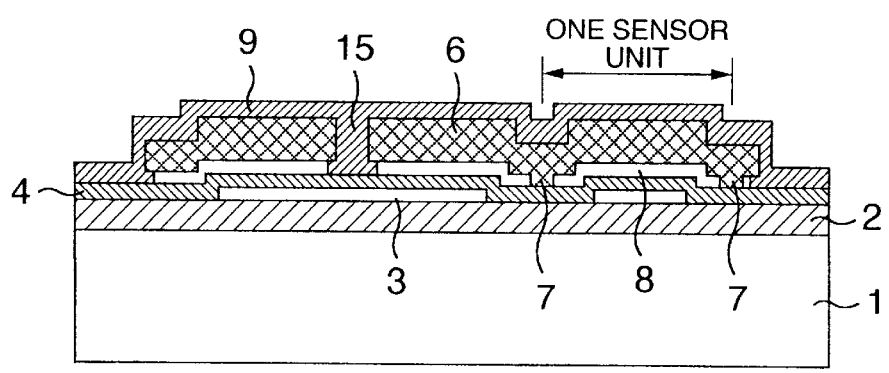
FIG. 5 is a sectional view of the same taken along a line A—A in FIG. 4.

Next, description will be directed to the capacitance-type pressure sensor according to a second embodiment of the present invention by reference to FIG. 4 and FIG. 5 in which FIG. 4 is a top plan see-through view of the capacitance-type pressure sensor and FIG. 5 is a sectional view of the same taken along a line A—A in FIG. 4.

Referring to FIGS. 4 and 5, the n-type polysilicon film portion 6 serving as the movable electrode is provided with etching holes 15 for forming the cavity region 8. The etching holes 15 are disposed on lines interconnecting the n-type polysilicon film portions 7 so that the size of diaphragm section supported by the n-type polysilicon film portions 7 and regionally partitioned thereby can remain uniform.

By etching the silicon oxide film by using the etching holes 15 to thereby form partitionarily the cavity region 8, the time required for etching is determined in dependence on the size of the sensor unit. Thus, the time required for forming the cavity region 8 can be significantly reduced when compared with the method of side-etching the n-type polysilicon film portion 6 from the outer peripheral ends thereof. Furthermore, the time taken for etching can be suppressed from increasing even when the number of the sensor units connected in parallel is increased. Thus, the throughput of the manufacturing process can be enhanced, and hence the capacitance-type pressure sensor can be manufactured at low cost.

The etching holes 15 are finally filled with the material of the silicon oxide film 9 employed for vacuum-sealing of the cavity region 8.

Embodiment 3

Figure 6:
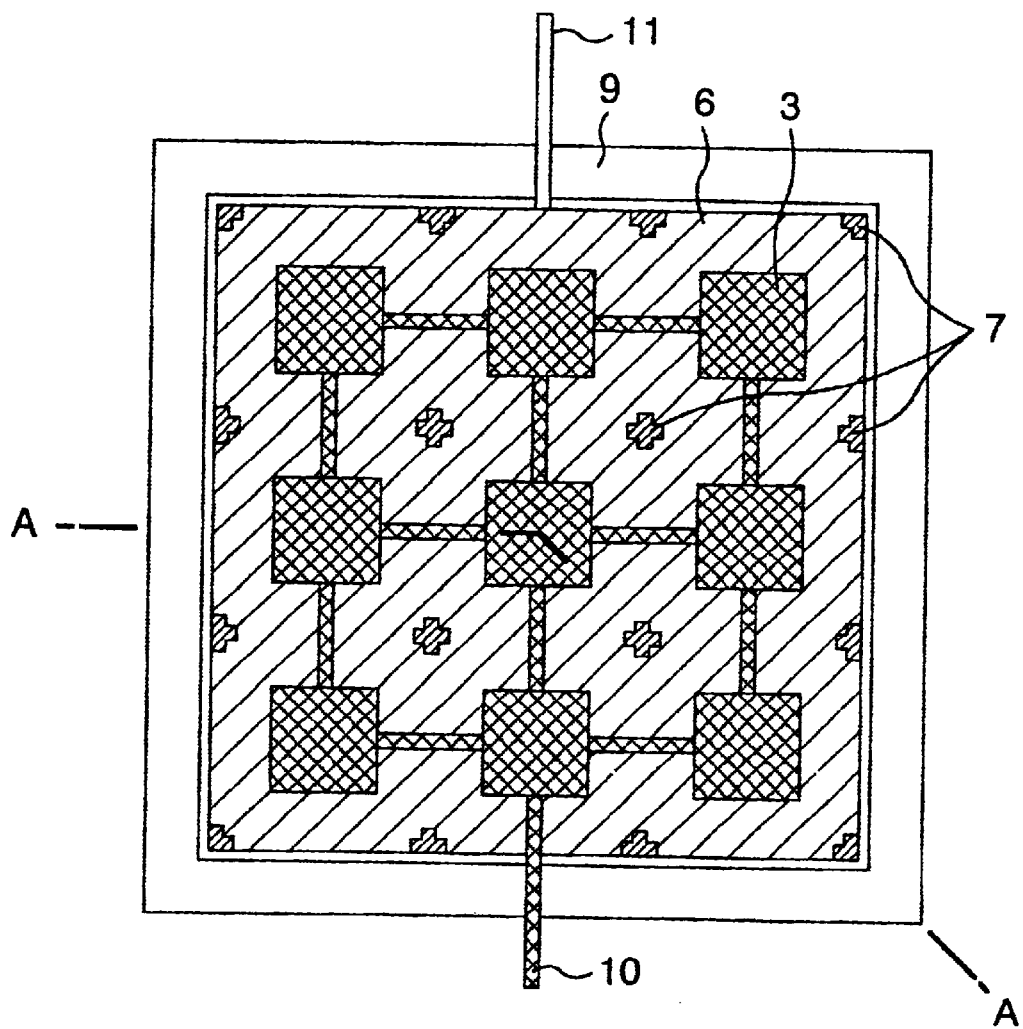
FIG. 6 is a top plan see-through view of the capacitance-type pressure sensor according to a third embodiment of the present invention.
Figure 7:
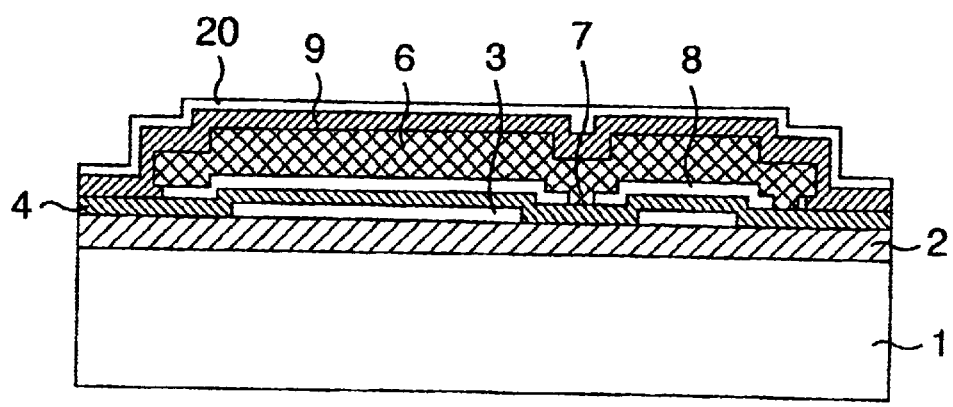
FIG. 7 is a sectional view of the same taken along a line A—A in FIG. 6.

Description will be made of the capacitance-type pressure sensor according to a third embodiment of the present invention by reference to FIG. 6 and FIG. 7 in which FIG. 6 is a top plan see-through view of the capacitance-type pressure sensor now concerned and FIG. 7 is a sectional view of the same taken along a line A—A in FIG. 6.

Referring to FIGS. 6 and 7, in the capacitance-type pressure sensor according to the third embodiment of the invention, an n-type polysilicon film 20 is formed over the silicon oxide film 9 so that the n-type polysilicon film 20 serves as a shielding electrode for preventing intrusion of contaminants such as moisture, movable ions or the like and noise from the exterior.

Between the n-type polysilicon film 20 serving as the shielding electrode and the n-type polysilicon film portion 6 serving as the movable electrode, there makes appearance parasitic capacitance having dielectric constituted by the silicon oxide film 9. In this conjunction, it is noted that since the n-type polysilicon film 20 which is to serve as the shielding electrode is so formed as to cover the whole sensor, the parasitic capacitance is determined substantially by the area of the n-type polysilicon film portion 6 which is to serve as the movable electrode.

With the structure of the capacitance-type pressure sensor according to the instant embodiment of the invention, the diaphragm, the cavity region and the diaphragm fixing portions of adjacent sensor units are shared in common among the sensor units with the area of the n-type polysilicon film portion 6 serving as the movable electrode being reduced to a necessity minimum. By virtue of this feature, the parasitic capacitance making appearance between the n-type polysilicon film 20 serving as the shielding electrode and the n-type polysilicon film portion 6 which is to serve as the movable electrode can be reduced. Thus, there is realized the capacitance-type pressure sensor which can ensure the enhanced reliability as well as the improved detection accuracy.

Many modifications and variations of the present invention are possible in the light of the teachings described above. It is therefore to be understood that within the scope of the appended claims, the invention may be practiced otherwise than as specifically described above.

What is claimed is:

1. A capacitance-type pressure sensor comprising:

a plurality of pressure sensor units connected in parallel with one another, each such sensor unit being formed by a fixed electrode contained on a semiconductor substrate;

a cavity region;

a diaphragm in the form of a sheet having an electrically conductive film which is disposed in opposition to said electrode, with said cavity region intervening between said electrode and said diaphragm; and diaphragm fixing portions disposed within said cavity region whereby the single sheet of the diaphragm is divided into a plurality of substantially separately deformable regions corresponding to said plurality of pressure sensor units, respectively; wherein said fixed electrode is formed on an insulation film on said substrate, and is covered on its surface by an insulation film;

a movable electrode is exposed opposite the fixed electrode; and the cavity region is sealed.

2. A capacitance-type pressure sensor according to claim 1,
wherein etching holes are formed in said diaphragm for thereby forming said cavity region.

3. A capacitance-type pressure sensor according to claim 2,
wherein etching holes are formed at positions on lines interconnecting said diaphragm fixing portion.

4. A capacitance-type pressure sensor according to claim 1,
wherein a conductive film is deposited over a surface of a topmost film constituting said diaphragm so as to cover said diaphragm wholly.

5. A capacitance-type sensor including a plurality of pressure sensor units connected in parallel with one another, each of said pressure sensors comprising:
a fixed electrode formed on a common substrate;
a cavity region; and
a diaphragm formed by an electrically conductive film which is disposed in opposition to said electrode with said cavity region intervening between said electrode and said diaphragm; wherein
diaphragms of said plurality of pressure sensors are formed by a single sheet of material that is common to all of said plurality of pressure sensors; and
diaphragm fixing portions are disposed within said cavity region so that said single sheet of the diaphragm is divided into a plurality of substantially separately deformable regions corresponding to said plurality of pressure sensor units, respectively;
said fixed electrode is formed on an insulation film on said substrate, and is covered on its surface by an insulation film;
a movable electrode is exposed opposite the fixed electrode; and
the cavity region is sealed.

6. The capacitance-type pressure sensor according to claim 5,
wherein etching holes are formed in said diaphragm for thereby forming said cavity region.

7. The capacitance-type pressure sensor according to claim 6,
wherein etching holes are formed at positions on lines interconnecting said diaphragm fixing portions.

8. The capacitance-type pressure sensor according to claim 5,
wherein a conductive film is deposited over a surface of a topmost film constituting said diaphragm so as to cover said diaphragm wholly.

9. A capacitance-type pressure sensor, comprising:
a substrate;
a plurality of fixed electrodes formed on said substrate and connected to one another in parallel;
a movable electrode in the form of a diaphragm comprising a single sheet of flexible material disposed in opposition to said electrodes, and separated therefrom by a cavity region; and
diaphragm fixing elements disposed at discrete locations within said cavity region, which diaphragm fixing elements partition said single sheet of flexible material into a plurality of separate flexure regions corresponding to said plurality of fixed electrodes, which flexure regions are deformable substantially separately from each other; wherein
said fixed electrode is formed on an insulation film on said substrate, and is covered on its surface by an insulation film;
the movable electrode is exposed opposite the fixed electrode; and
the cavity region is sealed.

* * * * *

UNITED STATES PATENT AND TRADEMARK OFFICE
CERTIFICATE OF CORRECTION

PATENT NO.     : 6,640,642 B1
DATED          : November 4, 2003
INVENTOR(S)    : Yasuo Onose et al.

It is certified that error appears in the above-identified patent and that said Letters Patent is hereby corrected as shown below:

<u>Title page,</u>
Item [73], Assignee, change to:

-- Hitachi, Ltd., Tokyo (JP)
      Hitachi Car Engineering Co., Ltd., (Ibaraki-ken ) (JP) --

Signed and Sealed this

Twentieth Day of July, 2004

JON W. DUDAS
*Acting Director of the United States Patent and Trademark Office*